United States Patent [19]

Hesse et al.

[11] Patent Number: 4,601,169
[45] Date of Patent: Jul. 22, 1986

[54] CHECK DEVICE FOR A REDUNDANT FLIGHT CONTROL APPARATUS

[75] Inventors: Konrad Hesse; Guenter Diessel, both of Mainz, Fed. Rep. of Germany

[73] Assignee: Feinmechanische Werke Mainz GmbH, Mainz, Fed. Rep. of Germany

[21] Appl. No.: 646,951

[22] Filed: Sep. 4, 1984

[30] Foreign Application Priority Data

Sep. 7, 1983 [EP] European Pat. Off. ........ 83108792.9

[51] Int. Cl.⁴ ............................................. F16D 31/02
[52] U.S. Cl. ........................................ 60/406; 60/425; 91/437; 91/438; 91/509
[58] Field of Search ................ 91/437, 438, 439, 509; 60/406, 425

[56] References Cited

U.S. PATENT DOCUMENTS

| | | | |
|---|---|---|---|
| 3,295,420 | 1/1967 | Gleason | 91/509 |
| 3,529,514 | 9/1970 | Mayo et al. | 91/509 |
| 3,561,322 | 2/1971 | Gerstine et al. | 91/437 |
| 3,683,749 | 8/1972 | Bayles | 91/509 |
| 3,928,968 | 12/1975 | Becker et al. | 91/509 |

Primary Examiner—A. Michael Chambers
Attorney, Agent, or Firm—Gifford, Groh, VanOphem, Sheridan, Sprinkle & Dolgorukov

[57] ABSTRACT

Check device for a redundant flight control apparatus comprising at least two servo drive devices. Failure in supplying fluid and wedging of a control valve (20) can be simulated. Failure of the bypass valve (35) can be checked by reading and comparing the volume flows of the respective pumps as well as by evaluating the travelling rate of the servo drives (1, 2) by the pilot.

5 Claims, 2 Drawing Figures

CHECK DEVICE FOR A REDUNDANT FLIGHT CONTROL APPARATUS

The invention relates to a check device for a redundant flight control apparatus which is particularly used for adjusting the rotor blades of a helicopter and can also be used in other aircraft.

For reasons of safety, the hydraulic and electrohydraulic servo control systems for flight controls use a tandem or double construction of two servo drive devices arranged parallel to one another in order to be in the position to carry out the flight control with one servo drive device, if the other servo drive device fails. In such a case of failure, it is essential that the flight control is not blocked. For this reason a so-called bypass valve is provided for circumventing the defective servo drive device, i.e. by hydraulically uncoupling it, in the present case by short-circuiting both chambers of an actuator of the defective servo drive device.

In order to make sure that both servo drives are functioning well, a check before flight should be carried out. Furthermore, in the case of failure during flight, watching over should be possible.

For testing accurate operation of the bypass valve, electrical position sensors can be used, including a plurality of sensors, electric elements, cables and sockets, as well as indicating instruments, due to the redundance of the servo drives existing in each so-called flight control axis.

SUMMARY OF THE PRESENT INVENTION

It is an object of the present invention to create a check device for a flight control apparatus using few indicating elements and making it possible to test good functioning by failure simulation before the flight. It is a further object of the invention to enable the pilot to watch over any defective hydraulic circuit of the flight control apparatus during flight.

With the invention, failure of the hydraulic supply in one of a group of servo drives is simulated, and it is detected whether the bypass valve in this situation operates properly. Furthermore, jamming of the respective control valve is simulated, and it is also detected, if the bypass valve reacts accurately thereupon. For carrying out these failure simulations, a valve for shutting-off the supply line and a locking means at the respective control valve are provided. As an indicating instrument to check failure only a volume flow-meter is needed. Based on observing one or all such instruments of a group of servo drives in the cockpit, when a failure simulation is carried out or during the flight in case of a failure occuring, the accurate operation of the bypass valve can be evaluated.

BRIEF DESCRIPTION OF THE DRAWINGS

An embodiment of the invention is shown in the drawings, wherein.

DETAILED DESCRIPTION OF A PREFERRED EMBODIMENT

Figure 1:
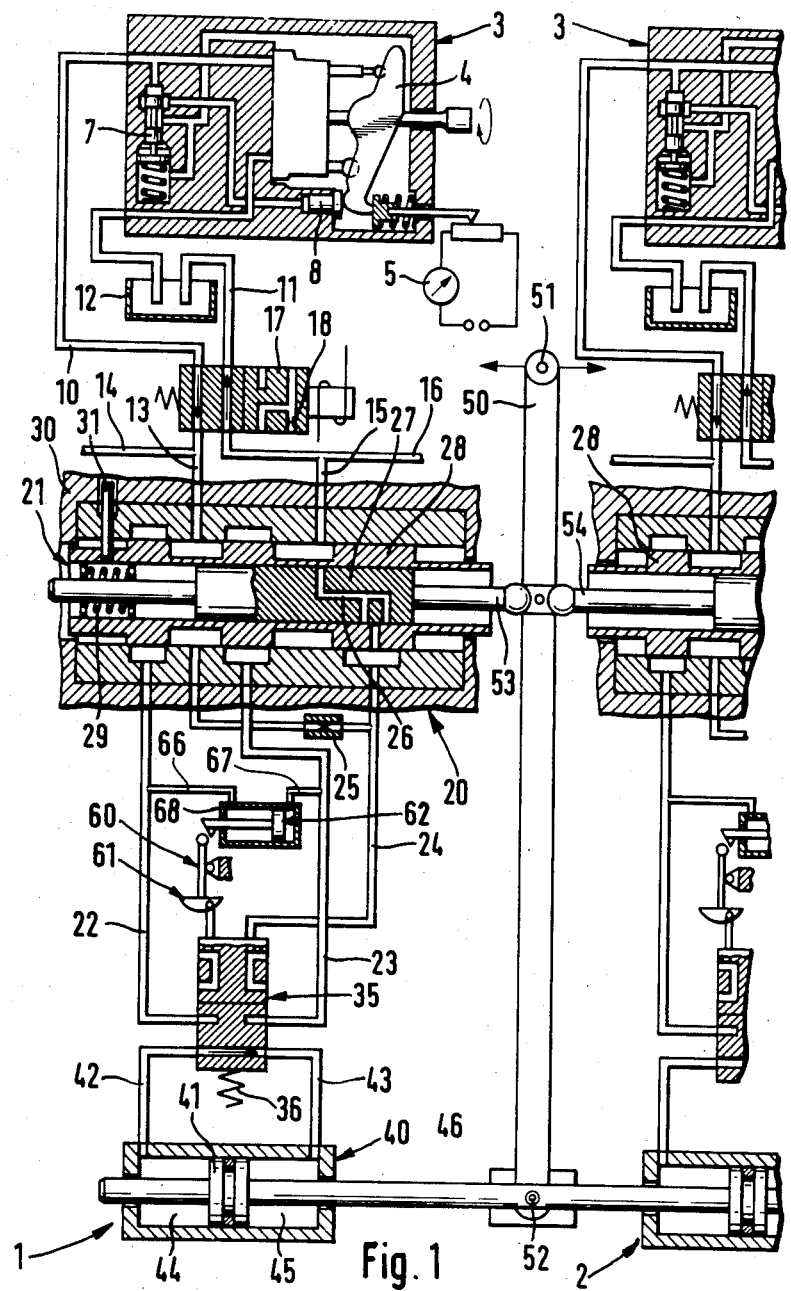
FIG. 1 is a diagram of one group of servo drive devices of a flight control device and FIG. 2 is an enlarged detail thereof.

The flight control apparatus comprises several groups of servo drive devices and a plurality of pumps for supplying same. Two servo drives 1 and 2 are indicated, the servo drive 1 being shown completely. Each servo drive 1, 2 is supplied by a variable displacement pump, for example an axial piston pump 3, having a swash plate 4 for varying the volumetric flow of the pump. The angular position of the swash plate 4 is a degree for the volumetric flow and is indicated by a measuring instrument 5. For pressure regulating, a compensator 7 is provided consisting of a pressure balancer, which regulates the pressure to a certain value in a supply line 10. The compensator 7 controls the supply of fluid to a piston 8, which determines the angular position of the swash plate 4, and therefore the flow out of the pump 3.

Adjacent to the supply line 10, a return line 11 to tank 12 is provided. The supply line 10 branches into supply lines 13, 14 and the return line 11 branches into return lines 15, 16. Further branching lines could be provided. Each branching supply line 13 and branching return line 15 are for operating one servo drive 1 of a group, while lines 14 and 15 are connected to a further group of servo drives. In this way, several servo drives, a so-called "axis", can be supplied with fluid by one and the same pump 3.

A solenoid-controlled valve 17 is arranged in the course of the lines 10, 11 and is normally open. In the switched position of the valve 17, the supply line 10 is shut off, whereas a restrictor 18 is included in the return line 11.

The supply line 13 leads to a casing of a control valve 20, which is a 4/3-directional valve in its main function and can shut off the line 13 or alternatively connect to an actuator inlet and outlet line 22 or 23. Furthermore, the control valve 20 comprises a bypass valve controlling line 24, which is connected to line 13 through a restrictor 25 and can be connected to the tank or return line 11 through an internal passage 26. The control valve 20 comprises a two-part spool 21 including an outer controlling spool 28 and an inner push-over spool 27, the outer element encompassing the inner element, which are connected to one another by centering springs 29. The controlling spool 28 comprises the usual controlling edges. The inner rod-like push-over spool 27 can be moved against the force of the springs 29, should the controlling spool 28 be jammed in the sleeve 30, which forms a portion of the valve casing. When there is relative movement between the inner push-over spool 27 and the outer controlling spool 28, the passage 26 is hydraulically connected to the control line 24, and the pressure thereof becomes low. Clamping of the control spool 28 can be made voluntary by pushing a blocking pin 31 through corresponding holes in the sleeve 30 and the spool 28.

The actuator lines 22, 23 lead to a bypass valve, which is a four-way directional valve 35 having a spool 37 (FIG. 2) that can take two positions. The bypass valve normally connects the lines 22 and 23 to actuator inlet and outlet lines 42 and 43, since normally there is pressure in the control line 24. In the bypass position of the valve, which is brought about by the force of a valve spring 36, the actuator inlet and outlet lines 42, 43 are short-circuited, whereas the lines 22 and 23 are closed.

The actuator inlet and outlet lines 42, 43 lead into cylinder chambers 44, 45 of an actuator 40 having an output piston 41, which is connected to the apparatus to be positioned, for example the angular drive of the rotor blades of a helicopter, through a piston rod 46. In case the lines 22, 23 are connected to the actuator inlet and outlet lines 42, 43, respectively, the piston 41 is driven and the member to be driven is positioned. If, however, the actuator inlet and outlet lines 42, 43 are short-circuited, as shown in the drawing of FIG. 1, the piston 41 takes a float position, since fluid displaced from chamber 44 can flow into chamber 45 so that the actuator and therefore the servo drive are not obstructed.

As already indicated, there is a further servo drive device 2 adjacent to servo drive device 1 and being of the same construction, so that no further description is necessary. The connection between both servo drive devices 1, 2 is through a control lever 50, which simultaneously is used for feeding back the regulating variable and for a portion of a control and feedback lever system. The control lever 50 has a lever end 51 being engaged by a joystick (not shown) or a connecting member to such a joystick and makes the lever 50 pivoting about a fulcrum 52. Fulcrum 52 is on the piston rod 46. Rods 53, 54 are linked to the control lever 50 and connected to the respective push-over spool 27. When the control lever 50 is pivoted, the control spool 28 is moved, normally into the desired position, since the force on the push-over spool 27 is transferred onto the control spool 28 by the spring 29.

If the control spool 28 becomes wedged, relative movement between push-over spool 27 and control spool 28 is possible and line 24 is connected to the return line 11 through the passage 26, such that the pressure in the control line 24 becomes low due to the restrictor 25. The bypass valve 35 can no longer stay in its open position due to its valve spring 36, so that the piston 41 takes its float position. The piston rod 46 therefore is not obstructed, when the adjoining servo drive device 2 fulfills the control operation properly.

If the control spool 28 of the servo drive device 1 jams, the push-over spool 27, when being returned, shuts off the control line 24 for a short time, as shown in the drawing, so that a certain pressure is built up in the control line 24 through the restrictor 25 and the bypass valve 35 is switched into the open position or an intermediate position. An operator can feel this at the joystick. If it is desired to avoid this phenomena, a latching device 60 may be provided comprising a catching device 61 and a releasing device 62.

Figure 2:
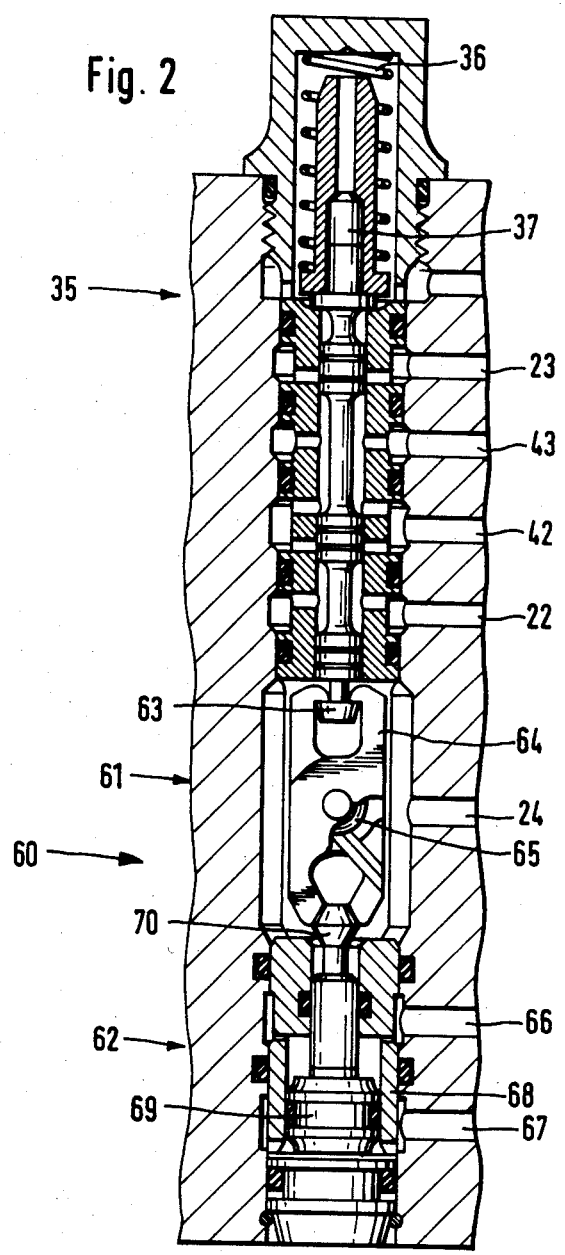

FIG. 2 shows the bypass valve 35 together with the latching device 60. A pawl 63 is fixed onto the valve spool 37 of the bypass valve 35, the pawl having bevelled surfaces and an undercut portion and cooperates with a pair of pliers 64 being also provided with a sloping surface and an undercut portion. The pair of pliers 64 is biased into a closed position by a spring 65. When the spool 37 moves into the bypass position, the pair of pliers is first opened due to the inclined surfaces of the pawl 63 and then is closed, the undercut portions of the pair of pliers and of the pawl engaging one another as shown in FIG. 2. The bypass valve 35 is caught in its bypass position, until a change in pressure occurs in the lines 22, 23. These are connected to a cylinder unit 68 through short lines 66 and 67, the cylinder unit having a piston 69, which is provided with a cam 70 cooperating with the pair of pliers 64. With a cycle of movement, the pair of pliers is opened, so that the bypass valve 35 can return to its normal position, which is taken when there is pressure in the control line 24.

For checking the performance of the bypass valve 35, a failure simulation is carried out.

Failure of the pump 3 of the servo drive device 1 or 2 is simulated by energizing the respective solenoid-controlled valve 17 after the engine or air craft of the helicopter has reached full speed and the system pressure has been attained. Checking is carried out by slowly moving the control lever 50. Since the solenoid valve 17 cuts off the delivery of the respective pump 3, this is indicated by the measuring instrument 5. In this situation, the bypass valve 35 should be in the bypass position shown and floating of the actuators means practically normal speed movement of piston 41 of the servo drive, since the adjacent pump 3 of the servo drive device 2 is still delivering fluid indicated by the measuring instrument thereof. If the bypass valve 35 did not switch in the position shown, the lines 22 or 23 stay connected with the cylindric chamber 44 or 45 through the inlet and outlet lines 42 or 43. This failure can be detected in that the piston 41 moves very slowly. This is caused by the restrictor 18 in the return line of the solenoid valve 17, when this takes the closing position for the supply line 10.

When the solenoid valve 17 is switched to its open position, the indications of both measuring instruments 5 must correspond. This is evidence that the bypass valve 35 is in position to connect through the lines 22 to 42 and 23 to 43. The same test is made by switching the solenoid valve 17 of the drive 2 into its closing position.

Jamming of the control spool 28 of the control valve 20 is simulated by shifting-in the locking pin 31. The control spool then cannot be moved and the different path of the control valve cannot be switched. In this case only the push-over spool 27 moves and attains a position, where the control line 24 practically is without pressure. The bypass valve 35 moves in the combined closing and floating position as shown in the drawing. If this is not the case, the piston 41 would be locked in the event that the control spool is latched in the center closed position, or the piston 41 moves very slowly in the event that the control spool shows a slight failure in its center closed position due to tolerances in production.

If there is a failure at the bypass valve 35 in that its valve spool 37 takes an intermediate position and not a defined end position, the pilot will be aware thereof by comparing adjacent instruments 5 which belong to a group of servo devices 1, 2. When controlling movements are carried out, the pistons 41 of each group move simultaneously and with the same rate due to their interconnection, so that all displaced flow through the respective cylinder units 40 of a group are the same. If the bypass valve 35 is in an intermediate position, there is an additional bleed flow delivered by the respective pump 3, so that this pump shows a larger volumetric flow value in relation to a neighboring pump.

Also a usual hydraulic flowmeter can be used for the instrument 5, which measures the angular position of the swash plate 4. The flowmeter can be arranged in the supply line 10, the return line 11 or in one of the lines 22 or 23 leading to the actuator. The solenoid valve 17 can also be a simple shutting-off valve for the supply line 10. For this case, a well-trained pilot can perceive a small change in the adjustment of the rotor blades of a helicopter. If there is no latching device 60, there will be a jerk perceptable when changing the control movement of the rotor blades, if simultaneously there is the rare case of the control spool 28 being wedged. Safety of flight control is not effected by this jerk.

Instead of using two devices 1 and 2 coupled together, also a plurality of devices can be used as is practiced in aircrafts. In lieu of using a mechanical control and feedback through the lever linkage 50, 53, 54, also an electric or electrohydraulic control and feedback means can be provided.

We claim:

1. In a redundant flight control apparatus comprising a plurality of variable displacement pumps each having a zero delivering position, a full stroke position and intermediate positions, at least a group of servo drive devices, and at least a manually operable control means for controlling said group of servo drive devices, each said pump having supply and return line means connected to at least one of said servo drive devices, each said servo drive device including a control valve for directional control of said supply and return line means, a bypass valve for putting the servo drive device out of operation, and an actuator having a double-acting piston, said control valve including a control spool for directionally controlling said supply and return line means and a push-over spool mounted for relative movement to said control spool for controlling pressure in a control line to said bypass valve, said control line being normally on high pressure, and, when said push-over spool is moved relative to said control spool, on low pressure, said bypass valve having a connecting through position for said supply and return line means when said control pressure is high, and a bypass position for shutting off said supply and return line means from said actuator and short circuiting said actuator, when said control pressure is low, said manually operable control means being linked to said push-over spools of said group of servo drive devices and to said pistons of said actuators, an improved check device for testing and detecting proper operation of said flight control apparatus comprising:

a group of flow-indicating instruments, each for detecting fluid flow in a particular one of said supply and return line means, a group of test valves, each included in one of said supply and return line means upstream of said control valve and adapted to normally connect through and, when actuated, to shut off said supply line so as to influence a corresponding said pump, which is connected to said particular supply and return line means, to take its zero delivering position, even if said manually operable control means is operated for a servo movement, and locking means for independently locking each said control spool of said control valve of said group, said check device functioning in that situations can be brought about in an arbitrary manner, wherein said bypass valve should go into its bypass position, and wherein achieving of said bypass position can be detected by observing said corresponding flow indicating instrument.

2. The improvement set forth in claim 1, wherein said variable displacement pump is an axial piston pump having a swash plate and said flow indicating instrument is a device for indicating the angle of said swash plate of said axial piston pump.

3. The improvement set forth in claim 1, wherein said test valve includes a restrictor, which will become effective in said return line, when said test valve is in its operated position.

4. The improvement set forth in claim 1, further comprising a group of latching devices, each being arranged adjacent to one of said bypass valves and including a catching means and a releasing means, said catching means being adapted to catch said spool of said bypass valve in said bypass position, said releasing means being connected to said supply and return line means downstream from said control valve and being adapted to release said catching means, when there are pressure changes in said supply and return line means downstream of said control valve.

5. The improvement set forth in claim 4, wherein said releasing means comprises a cylinder unit connected to said supply and return line means downstream of said control valve, said cylinder unit including a piston, a piston rod and a cam mounted on the piston rod, said piston and piston rod having a retracted and an extended position, said cam, in said extended position of said piston and piston rod, making said catching means inoperative.

* * * * *